United States Patent
Oh et al.

(10) Patent No.: US 10,609,227 B2
(45) Date of Patent: Mar. 31, 2020

(54) ELECTRONIC DEVICE SHOOTING IMAGE AND METHOD FOR DISPLAYING THE IMAGE

(71) Applicant: Samsung Electronics Co., Ltd., Suwon-si, Gyeonggi-do (KR)

(72) Inventors: Hae Wook Oh, Suwon-si (KR); Sung Jun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/202,674

(22) Filed: Nov. 28, 2018

(65) Prior Publication Data
US 2019/0166262 A1 May 30, 2019

(30) Foreign Application Priority Data
Nov. 29, 2017 (KR) .................. 10-2017-0162239

(51) Int. Cl.
*H04N 1/00* (2006.01)
*H04N 5/232* (2006.01)
(Continued)

(52) U.S. Cl.
CPC ......... *H04N 1/00206* (2013.01); *G06F 16/51* (2019.01); *G06F 16/583* (2019.01);
(Continued)

(58) Field of Classification Search
CPC ........... H04N 1/00206; H04N 1/00307; H04N 5/262; H04N 5/23216; H04N 5/2621;
(Continued)

(56) References Cited

U.S. PATENT DOCUMENTS 6,628,899 B1 * 9/2003 Kito ................... H04N 1/00132
348/207.1
8,006,276 B2 8/2011 Nakagawa et al.
(Continued)

FOREIGN PATENT DOCUMENTS

JP 2016-092682 A 5/2016
KR 10-2008-0034248 A 4/2008
(Continued)

OTHER PUBLICATIONS

European Search Report dated Feb. 13, 2019, issued in European Patent Application No. 18209095.1.
(Continued)

*Primary Examiner* — Abdelaaziz Tissire
(74) *Attorney, Agent, or Firm* — Jefferson IP Law, LLP

(57) ABSTRACT

An electronic device is provided. The electronic device includes a camera, a display, a communication module, a memory, and a processor that is electrically connected to the camera, the display, the communication module, and the memory. The processor transmits an advertising signal including first identification (ID) information of the electronic device to a peripheral external device by using a first communication scheme, receives a response signal including second ID information of the external device by using the first communication scheme, and stores image data collected through the camera to the memory in connection with the second ID information when a first user input shooting an image is made.

17 Claims, 9 Drawing Sheets

(51) Int. Cl.
*G06F 16/58* (2019.01)
*G06F 16/51* (2019.01)
*G06F 16/583* (2019.01)
*H04N 1/32* (2006.01)
*G06Q 10/06* (2012.01)
*G06Q 50/00* (2012.01)
*H04W 4/80* (2018.01)

(52) U.S. Cl.
CPC .............. *G06Q 10/06* (2013.01); *G06Q 50/01* (2013.01); *H04N 1/00156* (2013.01); *H04N 1/00307* (2013.01); *H04N 1/32117* (2013.01); *H04N 5/23206* (2013.01); *H04N 5/23261* (2013.01); *H04N 2201/0084* (2013.01); *H04N 2201/0089* (2013.01); *H04N 2201/3205* (2013.01); *H04W 4/80* (2018.02)

(58) Field of Classification Search
CPC ............... H04N 5/232; H04N 5/23206; H04N 5/232061; G06F 16/51; G06F 16/583; H04W 4/80; H04W 8/005
See application file for complete search history.

(56) References Cited

U.S. PATENT DOCUMENTS

| | | | |
|---|---|---|---|
| 8,670,597 B2 | 3/2014 | Petrou et al. | |
| 8,760,553 B2 | 6/2014 | Hwang et al. | |
| 8,799,277 B2 | 8/2014 | Park et al. | |
| 9,055,171 B2 | 6/2015 | Fujinawa et al. | |
| 9,167,108 B2 | 10/2015 | Fujinawa et al. | |
| 9,208,177 B2 | 12/2015 | Petrou et al. | |
| 9,313,399 B2 | 4/2016 | Morley | |
| 9,462,141 B2 | 10/2016 | Fujinawa et al. | |
| 9,888,136 B2 | 2/2018 | Fujinawa et al. | |
| 9,930,156 B2 | 3/2018 | Zhang et al. | |
| 10,031,927 B2 | 7/2018 | Petrou et al. | |
| 10,187,577 B2 | 1/2019 | Choi et al. | |
| 10,194,067 B2 | 1/2019 | Thorn et al. | |
| 10,264,146 B2 | 4/2019 | Fujinawa et al. | |
| 2002/0040440 A1* | 4/2002 | Hashimoto ............ G06F 16/58 726/26 |
| 2002/0186412 A1* | 12/2002 | Murashita .......... H04N 1/00127 358/1.16 |
| 2006/0136379 A1 | 6/2006 | Marino et al. | |
| 2007/0199033 A1 | 8/2007 | Nakagawa et al. | |
| 2009/0185763 A1* | 7/2009 | Park ...................... H04W 4/21 382/311 |
| 2010/0134508 A1* | 6/2010 | Kuboyama .......... G06F 9/451 345/581 |
| 2011/0014868 A1* | 1/2011 | Yun ..................... H04M 1/7253 455/41.2 |
| 2011/0038512 A1 | 2/2011 | Petrou et al. | |
| 2011/0105180 A1* | 5/2011 | Tanabe ............. H04M 1/72533 455/556.1 |
| 2012/0050549 A1* | 3/2012 | Maekawa .......... H04N 1/00153 348/207.1 |
| 2012/0081556 A1* | 4/2012 | Hwang .............. H04N 1/00411 348/207.1 |
| 2012/0281101 A1* | 11/2012 | Fujinawa .......... H04N 1/00127 348/207.1 |
| 2013/0178163 A1* | 7/2013 | Wang .................... H04W 48/10 455/41.2 |
| 2013/0182138 A1* | 7/2013 | Cho ...................... G06F 3/0482 348/211.3 |
| 2014/0172881 A1 | 6/2014 | Petrou et al. | |
| 2014/0211024 A1* | 7/2014 | Hiramatsu ......... H04N 1/00251 348/207.1 |
| 2014/0323048 A1* | 10/2014 | Kang ..................... H04W 4/80 455/41.2 |
| 2014/0368670 A1 | 12/2014 | Morley | |
| 2014/0368679 A1 | 12/2014 | Fujinawa et al. | |
| 2015/0189153 A1 | 7/2015 | Fujinawa et al. | |
| 2015/0245194 A1* | 8/2015 | Kim ........................ H04W 4/80 455/41.1 |
| 2015/0381874 A1* | 12/2015 | Wu .................... H04N 5/23206 348/211.2 |
| 2016/0055182 A1 | 2/2016 | Petrou et al. | |
| 2016/0241769 A1* | 8/2016 | Thorn .................. H04N 5/2257 |
| 2016/0277665 A1 | 9/2016 | Fujinawa et al. | |
| 2016/0366290 A1* | 12/2016 | Hoshino ........... H04N 1/00225 |
| 2017/0034324 A1 | 2/2017 | Zhang et al. | |
| 2017/0064205 A1 | 3/2017 | Choi et al. | |
| 2017/0289427 A1* | 10/2017 | Eum .................. H04N 5/23206 |
| 2018/0084397 A1* | 3/2018 | Sato .................. H04N 5/23222 |
| 2018/0124262 A1 | 5/2018 | Fujinawa et al. | |
| 2018/0131800 A1* | 5/2018 | Shintani .................. H04W 4/80 |
| 2018/0205870 A1* | 7/2018 | Ikeda ................. H04N 5/23206 |
| 2018/0322147 A1 | 11/2018 | Petrou et al. | |

FOREIGN PATENT DOCUMENTS

| | | | | |
|---|---|---|---|---|
| KR | 10-2009-0080272 A | | 7/2009 | |
| KR | 20160041620 A | * | 4/2016 | ............ H04W 8/005 |
| KR | 10-2016-0108832 A | | 9/2016 | |
| KR | 10-2017-0051397 A | | 5/2017 | |
| WO | 00/004657 A1 | | 1/2000 | |

OTHER PUBLICATIONS

International Search Report dated Mar. 18, 2019, issued in International Patent Application No. PCT/KR2018/014975.

* cited by examiner

ELECTRONIC DEVICE SHOOTING IMAGE AND METHOD FOR DISPLAYING THE IMAGE

CROSS-REFERENCE TO RELATED APPLICATION(S)

This application is based on and claims priority under 35 U.S.C. § 119(a) of a Korean patent application number 10-2017-0162239, filed on Nov. 29, 2017, in the Korean Intellectual Property Office, the disclosure of which is incorporated by reference herein in its entirety.

BACKGROUND

1. Field

The disclosure relates to an electronic device which shoots an image by using a camera.

2. Description of Related Art

An electronic device such as a smartphone, a tablet personal computer (PC), or the like may provide various functions such as a phone function, a video play function, and an Internet search function. In the case where the electronic device includes a camera, the electronic device may take an image and may display the image. For example, the electronic device may include one or more cameras, and may display a live view by using image data collected through the one or more cameras. In the case where a user pushes a shooting (or shutter release) button, an image may be stored.

The above information is presented as background information only to assist with an understanding of the disclosure. No determination has been made, and no assertion is made, as to whether any of the above might be applicable as prior art with regard to the disclosure.

SUMMARY

In the case where the user intends to share a shot photo or video with any other user, an electronic device according to the related art may transmit an image file through a complicated setting process. For example, the user may individually select an image file through a message application and may transmit the selected image file by using cellular communication based on a base station. For another example, the user establishes communication, which is used to exchange data over short distances, such as bluetooth (BT), Wi-Fi direct, or the like and selects and transmits an image file individually.

The electronic device according to the related art may transmit an image including a specific person shot by using facial recognition or the like, but it may be impossible to transmit the image to other device which a person not included in the image uses.

Aspects of the disclosure are to address at least the above-mentioned problems and/or disadvantages and to provide at least the advantages described below. Accordingly, an aspect of the disclosure is to provide an electronic device which shoots an image by using a camera.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a display, a communication module, a memory, and a processor that is electrically connected to the camera, the display, the communication module, and the memory. The processor is configured to transmit an advertising signal including first identification (ID) information of the electronic device to a peripheral external device by using a first communication scheme, receive a response signal including second ID information of the external device by using the first communication scheme, and store image data collected through the camera to the memory in connection with the second ID information when a first user input shooting an image is made.

An electronic device according to various embodiments of the disclosure may recognize a peripheral electronic device at a time to shoot an image, by using low-power communication such as bluetooth low energy (BLE). The electronic device may store ID information of the recognized peripheral device together with image data to allow a user to easily share the stored image with any other user.

The electronic device according to various embodiments of the disclosure may quickly search for and share an image associated with a specific person from a gallery application or an address book application.

The electronic device according to various embodiments of the disclosure may search for a peripheral device in a state where an image is displayed in a display and may quickly transmit an image to the found device by using a simple input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
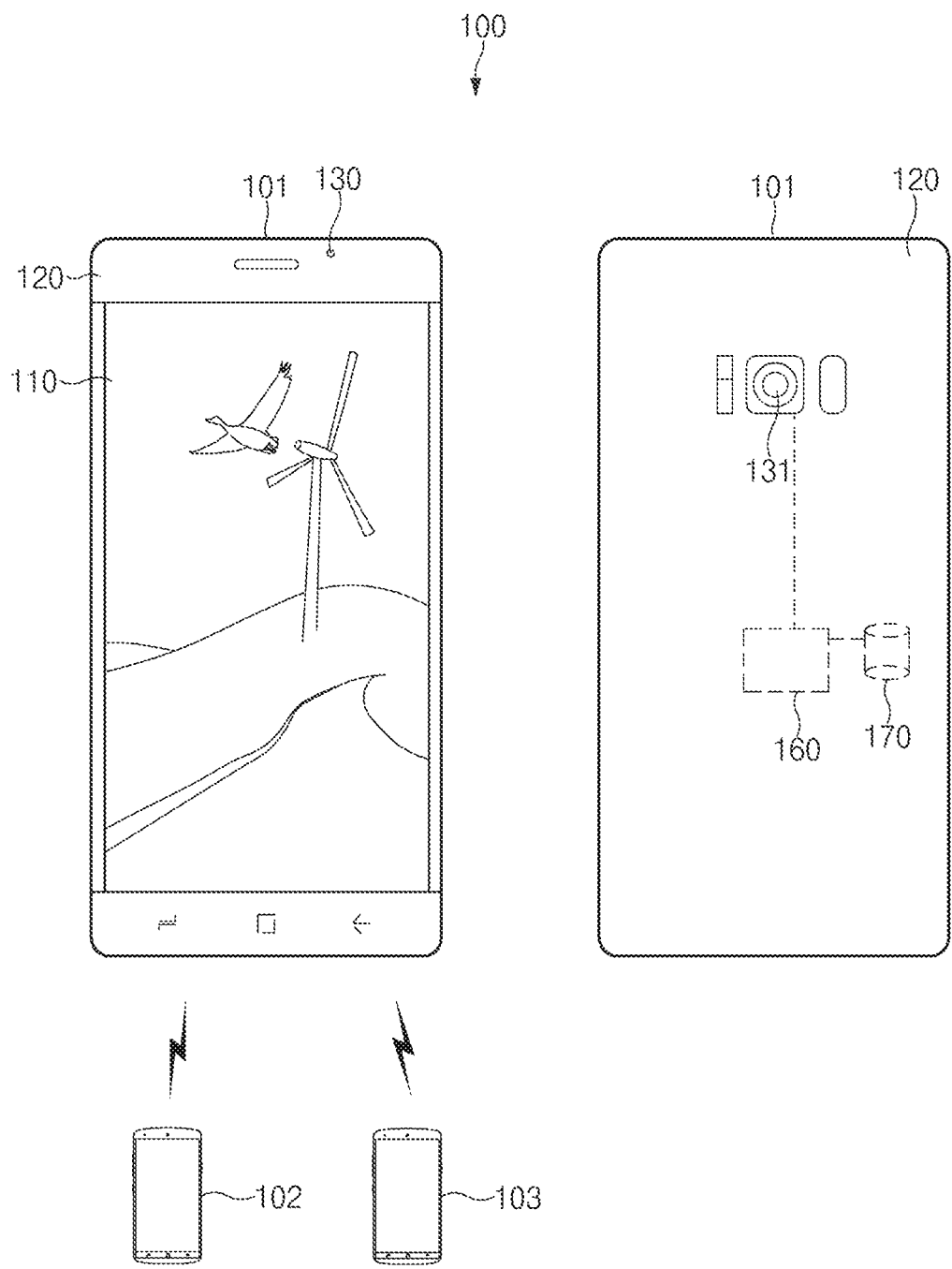
FIG. 1 is a view illustrating an image transmission system according to an embodiment of the disclosure.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal meaning unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the present disclosure will be described with reference to the accompanying drawings. The term "user" used herein may refer to a person who uses an electronic device or may refer to a device (for example, an artificial intelligence electronic device) that uses an electronic device.

FIG. 1 is a view illustrating an image transmission system 100 according to various embodiments of the disclosure.

Referring to FIG. 1, the image transmission system 100 may include a first electronic device 101, a second electronic device 102, and a third electronic device 103. The case where the image transmission system 100 includes the first electronic device 101 to the third electronic device 103 is illustrated in FIG. 1 as an example, but the disclosure is not limited thereto. The first electronic device 101 may include a display 110, a housing (or a main body) 120, a first camera 130, a second camera 131, a processor 160, and a memory 170. FIG. 1 is focused on components which shoot an image and display the shot image, but the disclosure is not limited thereto.

The display 110 may display content such as an image, a text, or the like. For example, the display 110 may display an execution screen of a camera application. In the case where the camera application is executed, the display 110 may display a live view image or may display a shot image. The display 110 may display a user interface (e.g., a shooting or shutter release button, a shooting setting button, or the like) associated with shooting an image.

In an embodiment, the display 110 may sense a touch input by a portion of a body of the user. For example, the display 110 may sense whether a touch input is made to a button for photo or video shooting.

The housing (or main body) 120 may fix the display 110 and may protect various components therein. A button (not illustrated), a sensor window (not illustrated), a speaker (not illustrated), the first camera 130, or the second camera 131 may be mounted on the exterior of the housing 120.

The first camera 130 and the second camera 131 may collect image data associated with an external object. Each of the first camera 130 and the second camera 131 may include a lens, an aperture, an image sensor, or the like. The image sensor may convert a light incident through a lens to an electrical signal. The first camera 130 may be positioned to face a first surface of the electronic device 101 (e.g., a surface on which the display 110 is mainly positioned). The second camera 131 may be positioned to face a second surface opposite to the first surface.

The housing (or main body) 120 may include various components, which are necessary to drive the electronic device 101, such as the processor 160, the memory 170, a communication module (not illustrated), a printed circuit board (not illustrated), or a battery (not illustrated) therein.

The processor 160 may process various data processing and operations for driving the electronic device 101. The processor 160 may execute various applications which may be executed at the electronic device 101 and may process a relevant operation.

In the case where image is shot by a shooting input of the user (e.g., in the case where a button for photo shooting is touched or in the case where a button starting video shooting is touched), the processor 160 may store the image data collected through the first camera 130 or the second camera 131.

According to an embodiment, the processor 160 may store information about the shot image (hereinafter referred to as "shooting environment information") together with the image data. For example, the shooting environment information may include information about a shooting site, a resolution, a shooting device, shooting settings, or the like.

According to an embodiment, the shooting environment information may include information (hereinafter referred to as "peripheral device information") about an external device placed on the periphery at a time when image data is stored. For example, the peripheral device information may include identification (ID) information (e.g., a phone number, a name of a user, a nickname, or the like) of each of the second electronic device 102 and the third electronic device 103 placed within a range in which bluetooth low energy (BLE) communication with the electronic device 101 is possible. The peripheral device information stored together with the image data may be used to share an image with any other device. Additional information about the way to share an image by using the peripheral device information will be provided through FIGS. 2 to 8.

The memory 170 may store data necessary for an operation of the electronic device 101. For example, the memory 170 may store data information about execution of an application installed at the electronic device 101. The memory 170 may store the image data collected through the first camera 130 or the second camera 131 and the shooting environment information.

The communication module (not illustrated) may communicate with an external electronic device (e.g., the second electronic device 102 or the third electronic device 103). The communication module (not illustrated) may support communication using direct communication between devices or communication using a separate relay device (e.g., an access point (AP) or a base station).

According to various embodiments of the disclosure, the communication module (not illustrated) may support a plurality of near field communication schemes. The communication module (not illustrated) may support a first communication scheme or a first near field communication scheme allowing the processor 160 to recognize the peripheral external electronic device 102 or 103 or the external electronic device 102 or 103 in the vicinity of the first electronic device 101. For example, the first communication scheme may be a BLE communication scheme. The BLE communication may be an inter-device direct communication scheme in which a peripheral device is recognized by transmitting an advertising signal or a broadcasting signal and receiving a response. The BLE communication may be performed with a relatively low power.

In an embodiment, the communication module (not illustrated) may support a second communication scheme or a second near field communication scheme (e.g., bluetooth (BT) communication) allowing the processor 160 to transmit a file (e.g., an image file) to the peripheral external electronic device 102 or 103. The second communication scheme may be a communication scheme such as wireless local area network (WLAN), BT, Zigbee, Z-Wave, ultra wide band (UWB), ultra narrow band (UNB), wireless universal serial bus (USB), wireless gigabit (WiGig), wireless high-definition (HD), TransferJet, wireless FireWire, or the like. The second communication scheme may be a communication scheme, the power consumption of which is greater than power consumption of the first communication scheme and which supports a fast speed at which a file is transmitted.

Figure 2:
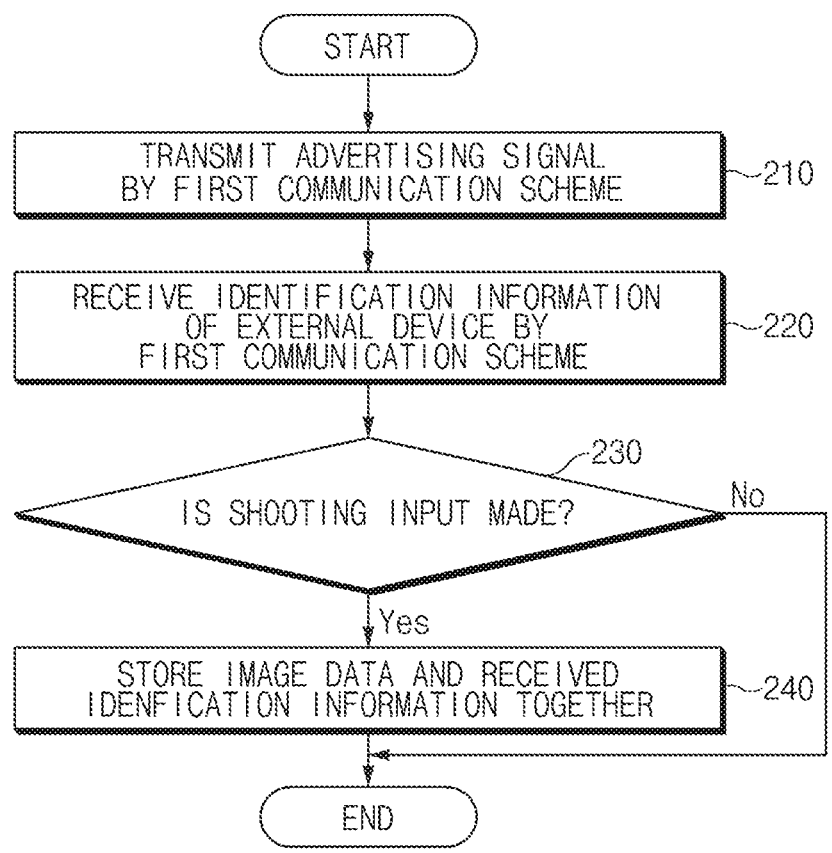
FIG. 2 is a flowchart illustrating an image display method according to an embodiment of the disclosure.

FIG. 2 is a flowchart illustrating an image displaying method according to various embodiments of the disclosure.

Referring to FIG. 2, in operation 210, the processor 160 of the first electronic device 101 may transmit an advertising signal or a broadcasting signal including ID information (hereinafter referred to as "first ID information") of the first electronic device 101 to a peripheral external device by using the first communication scheme.

For example, the first ID information may include device ID information (e.g., a unique device number or a phone number) of the first electronic device 101. The first ID information may also include ID information (e.g., a user name, a user nickname, a user ID, or the like) of a user which uses the first electronic device 101.

The processor 160 may encrypt and transmit the first ID information. For example, the first electronic device 101 may store a shared key which is shared with peripheral devices. The processor 160 may encrypt and transmit the first ID information by using the stored shared key.

The first communication scheme may be a BLE communication scheme. The BLE communication may support a transmission radius within approximately 10 meters and may make it possible to transmit or receive a small amount of data with a low power. In the BLE communication, a duty cycle may be several milliseconds (ms), and power consumption may decrease because a sleep mode is maintained during most of the time.

The processor 160 may generate the advertising signal depending on a specified condition. For example, in the case where a camera application is executed, the processor 160 may transmit the advertising signal to a peripheral device by using the first communication scheme. In the case where a gallery application is executed, in the case where a power of the first electronic device 101 is turned off, or in the case where a screen is unlocked, the processor 160 may transmit the advertising signal to a peripheral device by using the first communication scheme.

In operation 220, the processor 160 of the first electronic device 101 may receive a response signal including ID information (hereinafter referred to as "second ID information") of an external device (e.g., the second electronic device 102 or the third electronic device 103) by using the first communication scheme. For example, the second ID information may include device ID information (e.g., a unique device number, a phone number, or the like) of the second electronic device 102. The second ID information may include ID information (e.g., a user name, a user nickname, a user ID, or the like) of a user which uses the second electronic device 102.

The second electronic device 102 may receive the first ID information of the first electronic device 101 included in the advertising signal. The second electronic device 102 may match the first ID information with information stored in an internal memory (e.g., an address book database (DB)). In the case where the first ID information (e.g., a phone number or a user name) is matched with the information stored in the address book DB, the second electronic device 102 may transmit a response signal including the second ID information of the second electronic device 102 to the first electronic device 101. The response signal may be an advertising signal corresponding to the first communication scheme. The second electronic device 102 may encrypt and transmit the second ID information.

The processor 160 of the first electronic device 101 may determine whether the second ID information of the external device (e.g., the second electronic device 102 or the third electronic device 103) included in the response signal is matched with information (e.g., an address book DB) stored in the memory 170. In the case where the second ID information (e.g., a phone number or a user name) is matched with the information stored in the address book DB, the processor 160 may execute operation 230 and operation 240.

In operation 230, the processor 160 of the first electronic device 101 may determine whether a user input (hereinafter referred to as a "shooting input") for shooting an image is made.

For example, in the case where the camera application is executed, the processor 160 may display a live view image. The processor 160 may display a shooting button in the vicinity of the live view image. The shooting input may be an input touching the shooting button. Alternatively, the shooting input may be an input pushing a physical button, a gesture input, a voice input, or the like.

In operation 240, in the case where the shooting input is made, the processor 160 of the first electronic device 101 may store image data collected through a camera and the received second ID information (peripheral device information) together to the memory 170. For example, the processor 160 of the first electronic device 101 may store the second ID information in (or as) metadata of the image data. According to an embodiment, the processor 160 of the first electronic device 101 may store the first ID information and the second ID information together in connection with the image data.

The second ID information thus stored may be used to share an image with an external device. Additional information about the way to share an image by using the peripheral device information will be provided through FIGS. 5 to 8.

Figure 3:
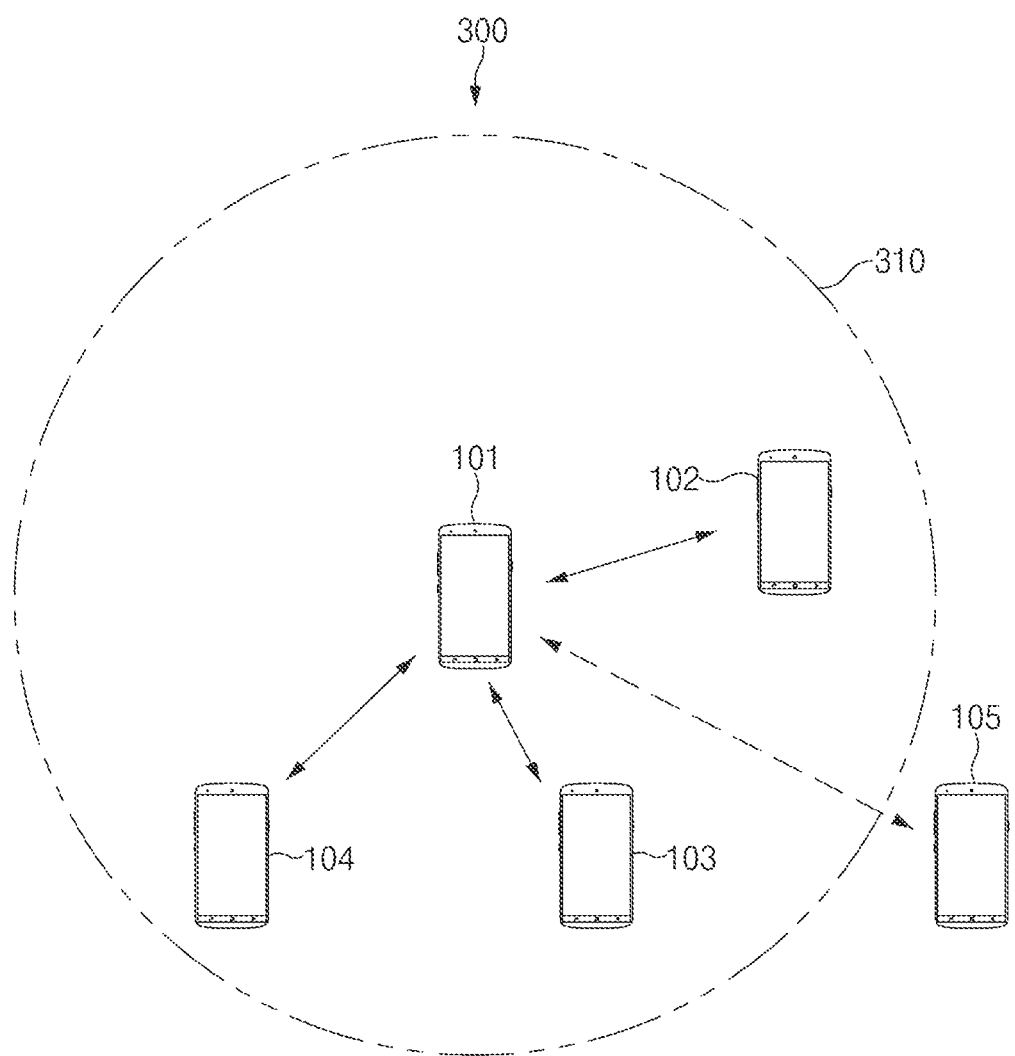
FIG. 3 is a view illustrating placement of external devices in the vicinity of a first electronic device according to an embodiment of the disclosure.

FIG. 3 is a diagram illustrating placement 300 of external devices in the vicinity of a first electronic device according to various embodiments of the disclosure. FIG. 3 is, and the disclosure is not limited thereto.

Referring to FIG. 3, the first electronic device 101 may recognize a peripheral electronic device by using the first communication scheme (e.g., BLE communication). The first electronic device 101 may transmit an advertising signal to the surrounding by using the first communication scheme. In response to the advertising signal of the first electronic device 101, each of peripheral electronic devices may transmit a response signal depending on a specified condition.

For example, second to fourth electronic devices 102 to 104 may be placed within a range 310 (e.g., within 10 meters with respect to the first electronic device 101), in which BLE communication is possible, with respect to the first electronic device 101, and a fifth electronic device 105 may be out of the range 310 in which the BLE communication is possible.

In the case where the first electronic device 101 transmits the advertising signal including the first ID information to peripheral devices, each of the second to fourth electronic devices 102 to 104 may receive the advertising signal and may determine whether to transmit a response signal. In the case where the first ID information included in the advertising signal is matched with information stored in an internal memory of each of the second to fourth electronic devices 102 to 104, each of the second to fourth electronic devices 102 to 104 may transmit the response signal including the second ID information.

In the case where the first electronic device 101 receives the second ID information from the second to fourth electronic devices 102 to 104, the first electronic device 101 may display text or icons associated with the second ID information in a screen or may store the second ID information together with the shot image. The stored image may be transmitted to the second to fourth electronic devices 102 to 104 at a gallery app in response to a simple user input.

The first electronic device 101 may not perform a process of exchanging ID information with regard to the fifth electronic device 105 from which a response signal is not received.

The first electronic device 101 may store ID information of an external device (e.g., the fifth electronic device 105) not included in the communication-possible range 310 together with data of a shot image. For example, while the live view image is displayed, the first electronic device 101 may display a button for adding any other user (or an electronic device of any other user) to be stored together. In the case where a user touches the button, the first electronic device 101 may display a contact list stored in the address book DB. In the case where the user selects one contact in the list, the first electronic device may store a name or a phone number of the selected contact together with the shot image.

Figure 4:
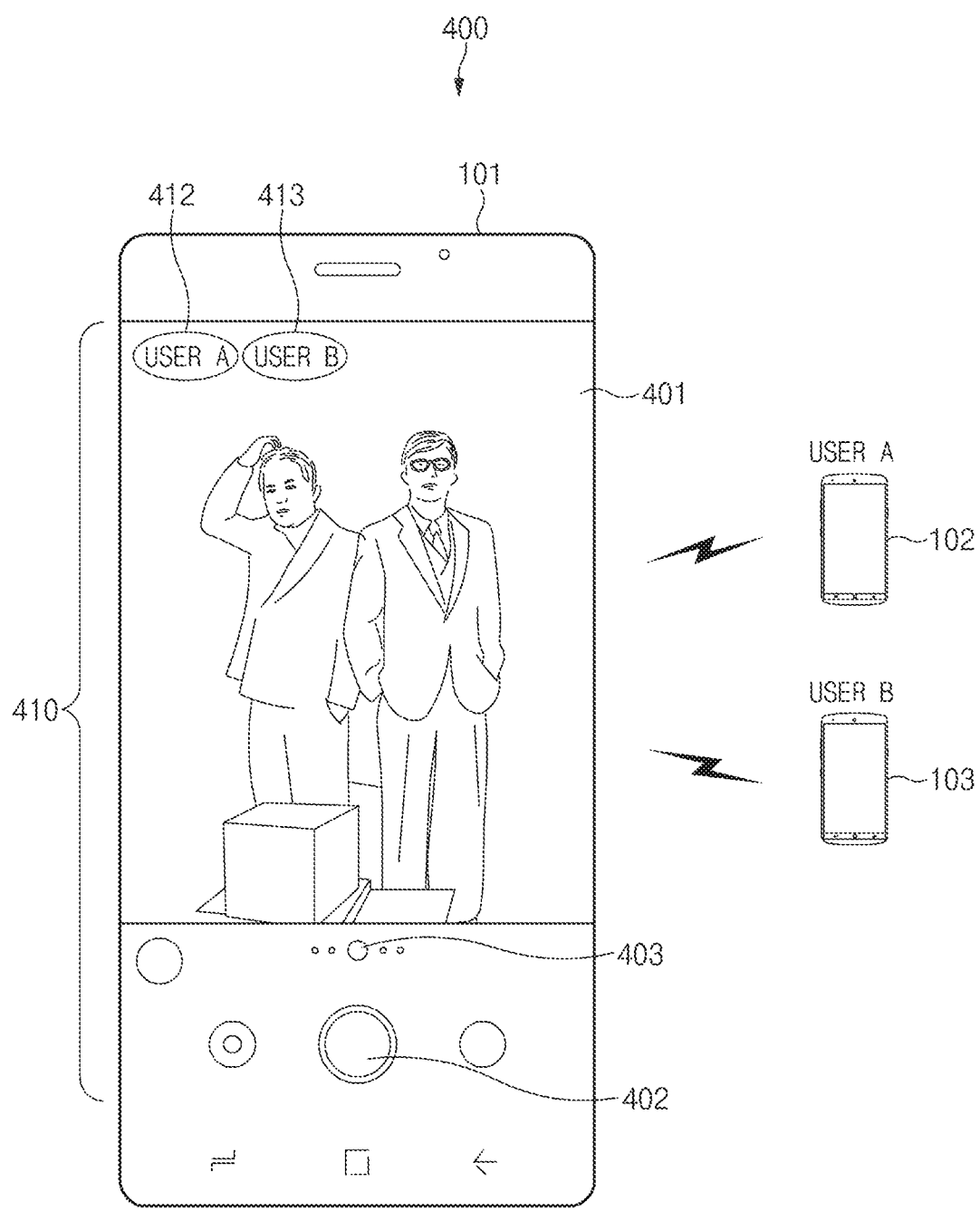
FIG. 4 is a view illustrating a screen example associated with a method for recognizing an external device in a live view screen according to an embodiment of the disclosure.

FIG. 4 is a view illustrating a screen example 400 associated with a method for recognizing an external device in a live view screen according to various embodiments of the disclosure.

Referring to FIG. 4, the processor 160 of the first electronic device 101 may display a user interface 410 for image shooting in the display 110. The user interface 410 may include a live view image 401, a shooting button 402, a shooting setting button 403, or the like. A user may shoot a photo or a video while checking the live view image 401.

The processor 160 may output peripheral device marks (or indications) 412 and 413 in the user interface 410 for image shooting.

The processor 160 may exchange ID information with the peripheral external electronic devices 102 and 103 by using the first communication scheme (e.g., BLE communication). The processor 160 may output the peripheral device marks 412 and 413 based on the ID information received from the external electronic devices 102 and 103. In the case where a camera application is executed, the processor 160 may start a process of recognizing a peripheral device by using the first communication scheme.

For example, in the case where user names (e.g., USER A and USER B) registered at the external electronic devices 102 and 103 are received from the external electronic devices 102 and 103, the processor 160 may match the user names with an address book DB stored in the memory 170. In the case where the received user names correspond to contacts stored in the address book DB, the processor 160 may display the peripheral device marks 412 and 413 including the user names received from the external electronic devices 102 and 103 in a screen.

In the case where phone numbers registered at the external electronic devices 102 and 103 are received from the external electronic devices 102 and 103, the processor 160 may match the phone numbers with the address book DB stored in the memory 170. In the case where the received phone numbers correspond to contacts stored in the address book DB, the processor 160 may verify user names (e.g., USER A and USER B) respectively linked to the phone numbers. The processor 160 may display the peripheral device marks 412 and 413 including the matched user names (e.g., USER A and USER B) in a screen.

In the case where a shooting input is made to the shooting button, the second ID information, or information matched with the second ID information in the address book DB, may be stored together with data of a shot image.

When the shooting input is made, the processor 160 may transmit the shot image to a recognized external electronic device. For example, in a process of recognizing an external electronic device by using the first communication scheme, the processor 160 may receive address information of the external electronic device for connection of the second communication scheme. In the case where the shooting input is made, the processor 160 may store the data of the shot image together with the first ID information and the second ID information, and may transmit the stored image to the external electronic device in real time based on the received address information.

Figure 5:
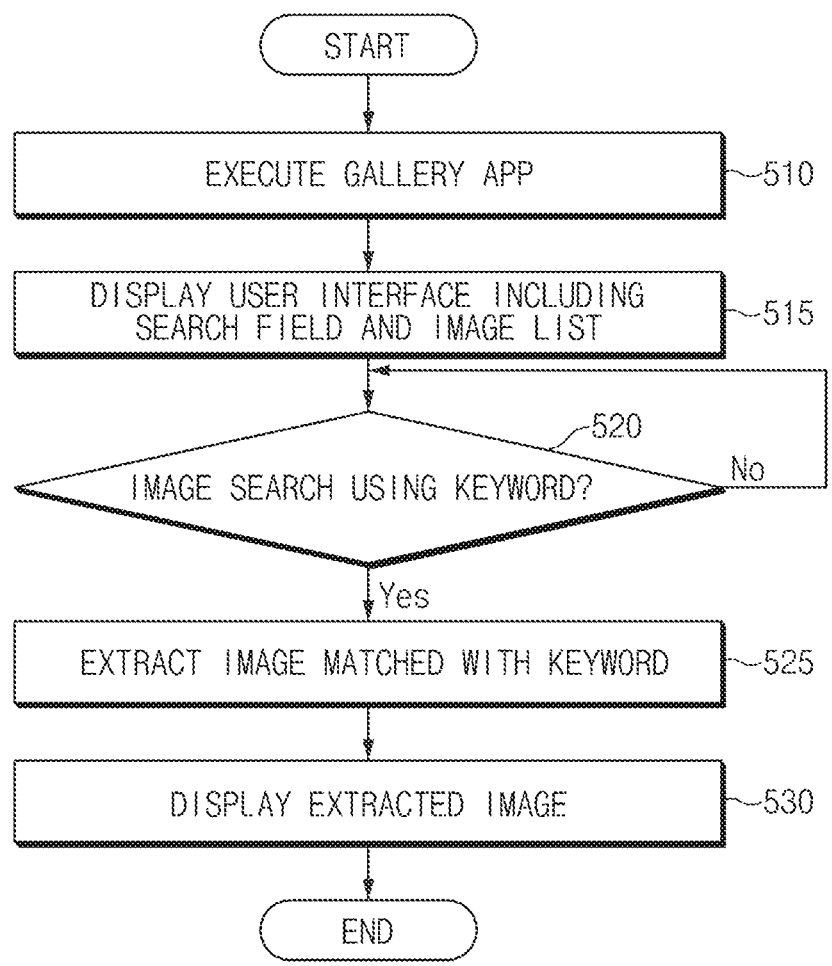
FIG. 5 is a flowchart illustrating a method for displaying an image in a gallery app based on keyword search according to an embodiment of the disclosure.

FIG. 5 is a flowchart illustrating a method for displaying an image in a gallery app based on keyword search, according to an embodiment of the disclosure.

Referring to FIG. 5, in operation 510, the processor 160 of the first electronic device 101 may execute a gallery application. The gallery application may be executed by a user input or may be executed by a call of any other application.

At least a portion of an image stored in the memory 170 of the first electronic device 101 may be stored in connection with information (peripheral device information) about an external electronic device placed on the periphery upon shooting. For example, ID information of an external device which is placed in the vicinity of the first electronic device 101 at a time when image data is stored may be stored in the shooting environment information (or metadata) of the stored image.

In operation 515, the processor 160 may display a user interface including a search field for a keyword input. For example, the processor 160 may display an image stored in the memory 170 in the form of a thumbnail list. The processor 160 may display the search field which may input a keyword, in an upper region of the list.

In operation 520, the processor 160 may determine whether a keyword is input to the search field and is found. For example, the processor 160 may determine whether a user inputs a name or a phone number stored in the address book DB in the form of a keyword and pushes a search button. The keyword may be a name, a nickname, a phone number, an e-mail, a birthday, or the like associated with the contact stored in the address book DB.

In operation 525, the processor 160 may extract an image through matching with peripheral device information stored together with image data, based on the keyword which the user inputs. For example, in the case where the keyword which the user inputs is a user name and the peripheral device information stored together with the image data is a phone number, the processor 160 may verify a phone number matched with the user name, which is input in the form of a keyword, from the address book DB. The processor 160 may match peripheral device information stored together with an image, by using the verified phone number.

In operation 530, the processor 160 may display the extracted image. For example, the processor 160 may display the extracted image in the form of a thumbnail.

The processor 160 may display a user interface which may immediately transmit the extracted image to an external electronic device. For example, in the case where the keyword is found, the processor 160 may determine whether an external device having the keyword (or information about the keyword) as ID information is placed on the periphery, through the first communication scheme (e.g., BLE communication). The processor 160 may display a send button which may transmit an image to an external electronic device recognized by the first communication scheme. In the case where the user touches the send button, the processor 160 may transmit all or a part of images found through the keyword to the external electronic device through the second communication scheme (e.g., Wi-Fi direct or bluetooth).

Figure 6:
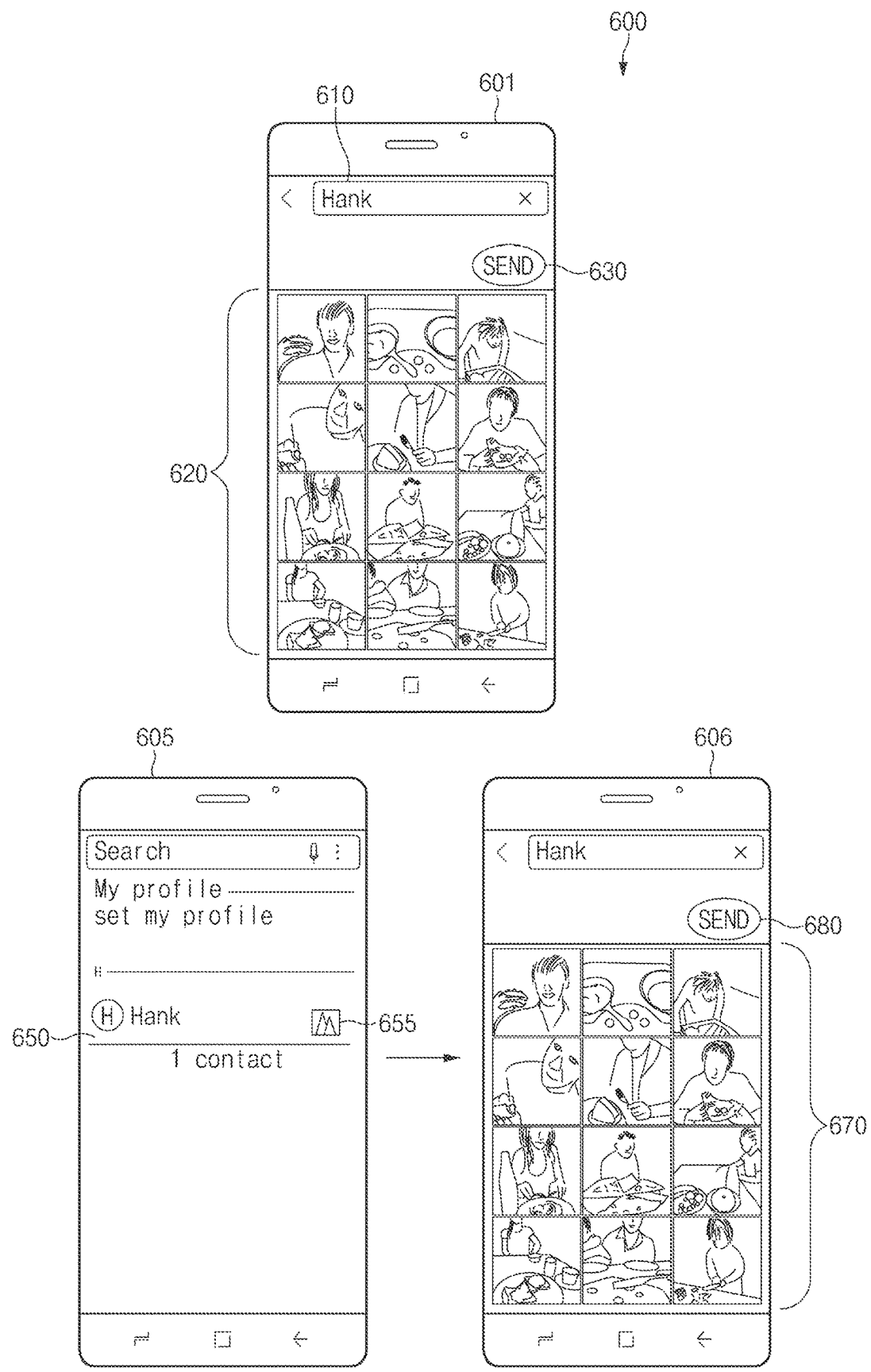
FIG. 6 is a view illustrating a screen example of outputting an image list according to an embodiment of the disclosure.

FIG. 6 is a view illustrating an example of a screen 600 outputting an image list according to various embodiments of the disclosure. FIG. 6 is, and the disclosure is not limited thereto.

Referring to FIG. 6, in screen 601, the processor 160 may execute a gallery application. The processor 160 may output a user interface including a search field 610 which may input a keyword and an image list 620 of a thumbnail form.

A user may search for a photo associated with a desired person by inputting a user name, a phone number, an e-mail, or the like stored in an address book DB to the search field 610. In the case where the user inputs a keyword and pushes a search button, an image having peripheral device information about the keyword which the user inputs may be displayed in the image list 620.

The processor 160 may match the peripheral device information stored together with image data, based on the keyword which the user inputs. For example, in the case where the input keyword is a user name (e.g., Hank) and peripheral device information stored together with an image is a phone number, the processor 160 may determine the phone number matched with the user name, which is input in the form of the keyword, from the address book DB. The processor 160 may match the peripheral device information stored together with the image, by using the determined phone number. In the case where the keyword which the user inputs is a user name and peripheral device information stored together with an image is a user name, the processor 160 may match the peripheral device information stored together with the image by using the user name input in the form of the keyword.

In the case where the image is extracted by using the keyword and the peripheral device information, the processor 160 may display a user interface which may immediately transmit the extracted image to an external electronic device.

In the case where the keyword is found, the processor 160 may determine whether an external device having the keyword (or information about the keyword) as ID information is placed on the periphery, through the first communication scheme (e.g., BLE communication). The processor 160 may display a send button 630 which may transmit an image to an external electronic device recognized by the first communication scheme. In the case where the user touches the send button 630, the processor 160 may transmit all or a part of images found through the keyword to the external electronic device through the second communication scheme (e.g., Wi-Fi direct or bluetooth).

In screen 605, the processor 160 may perform an address book application. The processor 160 may display a contact list stored in an address book DB. A contact 650 included in the list may include an image search button 655 for displaying an image stored in connection with the contact 650. In the case where the user select the image search button 655, the processor 160 may extract an image in which a portion of information stored in the contact 650 is included in metadata of image data and may display an image list 670.

In screen 606, in the case where the image search button 655 is selected, the processor 160 may display a user interface which may immediately transmit the extracted image to an external electronic device. For example, in the case where the address book application is executed, the processor 160 may determine whether an external device is placed on the periphery, through the first communication scheme (e.g., BLE communication). In the case where the user selects the image search button 655, the processor 160 may display a send button 680 which may transmit an image to an external electronic device recognized by the first communication scheme. In the case where the user touches the send button 680, the processor 160 may transmit all or a part of extracted images to the external electronic device through the second communication scheme (e.g., Wi-Fi direct or bluetooth).

Figure 7:
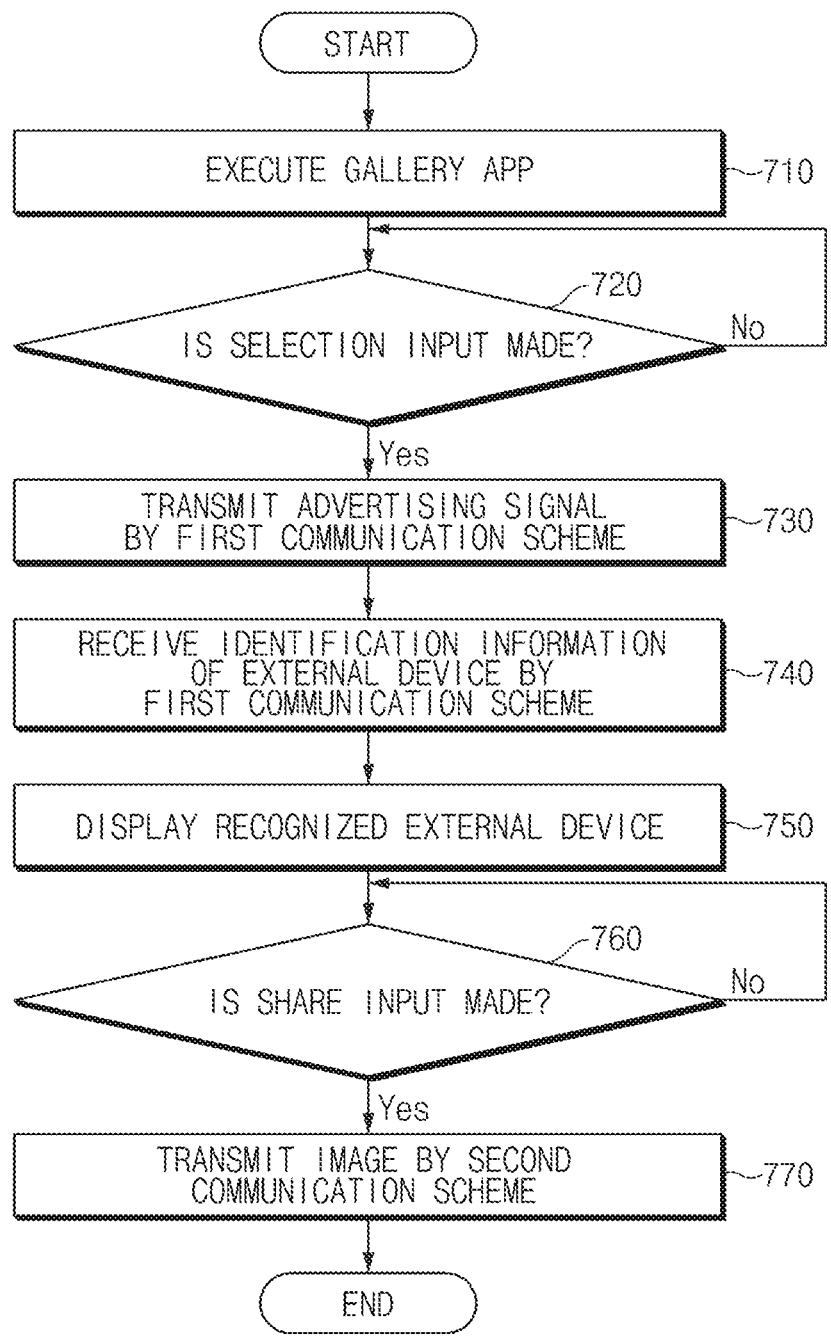
FIG. 7 is a flowchart illustrating a method for sharing an image in a gallery app according to an embodiment of the disclosure.

FIG. 7 is a flowchart illustrating a method for sharing an image in a gallery app according to an embodiment of the disclosure. FIG. 7 is, and the disclosure is not limited thereto.

Referring to FIG. 7, in operation 710, the processor 160 may execute a gallery application. The gallery application may be executed by a user input or may be executed by a call of any other application. The processor 160 may display an image list (e.g., the image list 620 or 670 of FIG. 6) in the form of a thumbnail in the display 110.

In operation 720, the processor 160 may determine whether a user input selecting one image in the image list is made. The processor 160 may enlarge and display a thumbnail image selected by the user input depending on a screen ratio.

In operation 730, the processor 160 may transmit an advertising signal (or a broadcasting signal) including the first ID information of the first electronic device 101 to a peripheral external device by using the first communication scheme.

For example, the first ID information may include device ID information (e.g., a unique device number or a phone number) of the first electronic device 101. The first ID information may include ID information (e.g., a user name, a user nickname, a user ID, or the like) of a user which uses the first electronic device 101.

In operation 740, the processor 160 of the first electronic device 101 may receive a response signal including second ID information of the external device by using the first communication scheme. For example, the second ID information may include device ID information (e.g., a unique device number, a phone number, or the like) of the external device. The second ID information may include ID information (e.g., a user name, a user nickname, a user ID, or the like) of a user which uses the external device.

According to various embodiments of the disclosure, operation 730 and operation 740 may be performed before operation 710 and operation 720 or may be executed between operation 710 and operation 720.

In operation 750, the processor 160 may output a peripheral device mark based on the ID information received from the external electronic device. For example, in the case where a user name is received from the external electronic device, the processor 160 may match the received user name with an address book DB stored in the memory 170. In the case where the received user name corresponds to a contact stored in the address book DB, the processor 160 may display the user name received from the external electronic device in a screen.

In the case where the second ID information received from the external electronic device is included in metadata of the image (the image selected by the user input in operation 720) being displayed, the processor 160 may output a peripheral device mark associated with the external electronic device. In the case where the second ID information received from the external electronic device is not included in metadata of the image (the image selected by the user input in operation 720) being displayed, the processor 160 may not output the peripheral device mark associated with the external electronic device.

In operation 760, the processor 160 may determine whether an input (hereinafter referred to as a "share input") for sharing the image (the image selected by the user input in operation 720) being displayed with the recognized external electronic device is made. The share input may be an input touching the peripheral device mark on the screen.

In operation 770, the processor 160 may transmit the image (the image selected by the user input in operation 720) being displayed to the external electronic device by using the second communication scheme.

In an embodiment, in a process (operation 730 and operation 740) of recognizing the external electronic device by using the first communication scheme, the processor 160 may receive address information of the external electronic device for connection of the second communication scheme. The processor 160 may transmit the image being displayed to the external electronic device by using the second communication scheme which uses the received address information. For example, the second communication scheme may be a communication scheme such as WLAN, BT, Zigbee, Z-Wave, UWB, UNB, wireless USB, WiGig, wireless HD, TransferJet, wireless FireWire, or the like.

The user may simply share an image with any other electronic device by touching a button displayed together with the image, without searching for a photo associated with a specific person or without performing a setting operation for a file transfer.

An image display method according to various embodiments of the disclosure may be performed in an electronic device and may include transmitting an advertising signal including first ID information of the electronic device to a peripheral external device by using a first communication scheme, receiving a response signal including second ID information of the external device by using the first communication scheme, and, when a first user input shooting an image is made, storing image data collected through a camera to a memory in connection with the second ID information.

The method may further include storing the collected image data in connection with the second ID information when the second ID information is matched in a DB associated with an address book stored in the memory.

The method may further include storing the first ID information and the second ID information in metadata of the collected image data.

The method may further include displaying a list of images stored in the memory and a search field for inputting a keyword, determining whether a second user input searching for the keyword is made, and, when the second user input is made, matching the second ID information stored in connection with the image data with a keyword which is input to the field.

The method may further include updating the list based on a result matched with the keyword.

The method may further include displaying at least one of images stored in the memory in a display, and recognizing a peripheral device by using the first communication scheme.

Figure 8:
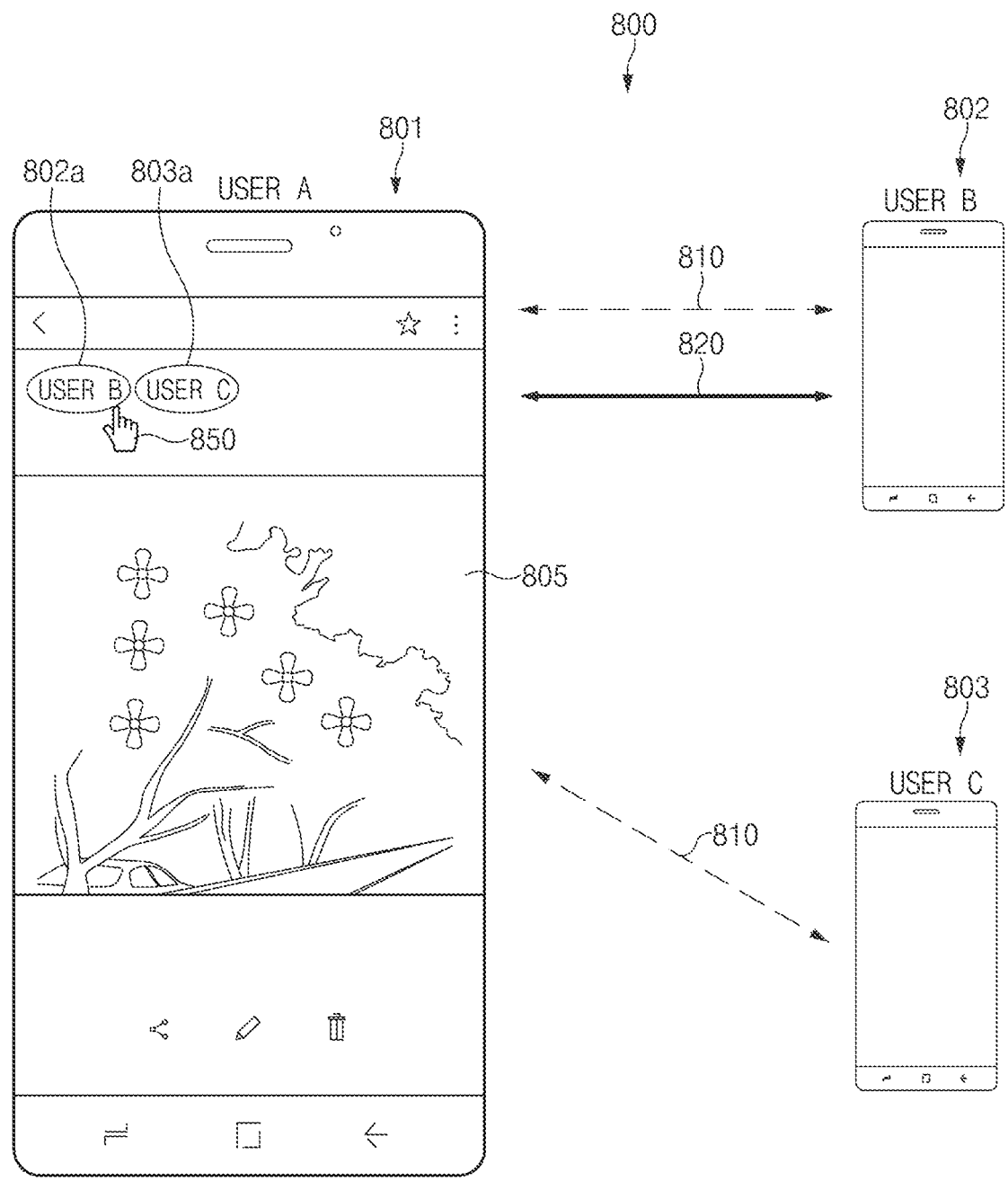
FIG. 8 is a view illustrating a screen example associated with a method for sharing an image in a gallery app according to an embodiment of the disclosure.

FIG. 8 is a view illustrating a screen example 800 associated with a method for sharing an image in a gallery app according to various embodiments of the disclosure. FIG. 8 is, and the disclosure is not limited thereto.

Referring to FIG. 8, the first electronic device 801 (e.g., the first electronic device 101) may execute a gallery application. The first electronic device 101 may enlarge and display an image 805 selected by a user input depending on a screen ratio.

The first electronic device 101 may exchange ID information with an external electronic device (e.g., the second electronic device 102 or the third electronic device 103), by using a first communication scheme 810.

The first electronic device 101 may output a peripheral device mark 802a or 803a based on second ID information received from the external electronic device (e.g., the second electronic device 102 or the third electronic device 103). For example, in the case where a user name (e.g., USER B 802 or USER C 803) is received from the second electronic device 102 or the third electronic device 103 through the first communication scheme 810, the first electronic device 101 may match the received user name with an address book DB stored in the memory 170. In the case where the received user name corresponds to a contact stored in the address book DB, the first electronic device 101 may display the peripheral device mark 802a or 803a including the user name (e.g., USER B or USER C) received from the external electronic device 102 or 103 in a screen.

In an embodiment, in the case where the second ID information (e.g., USER B) received from the external electronic device (e.g., the second electronic device 102) is included in metadata of an image being displayed, the first electronic device 101 may output the peripheral device mark 802a associated with the external electronic device (e.g., the second electronic device 102). In an embodiment, in the case where the second ID information (e.g., USER C) received from the external electronic device (e.g., the third electronic device 103) is not included in the metadata of the image being displayed, the first electronic device 101 may not output the peripheral device mark 803a associated with the external electronic device (e.g., the third electronic device 103).

The first electronic device 101 may determine whether a share input 850 for sharing an image with the external electronic device (e.g., the second electronic device 102) is made. The share input 850 may be an input selecting the peripheral device mark 802a on the screen.

For example, in the case where the share input 850 for sharing the image with the second electronic device 102 is made, the first electronic device 101 may transmit the image being displayed to the second electronic device 102 by using a second communication scheme 820.

The first electronic device 101 may receive address information for connection of the second communication scheme 820, in a process of recognizing the second electronic device 102 through the first communication scheme 810. In the case where the share input 850 is made, the first electronic device 101 may transmit the image being displayed to the second electronic device 102 through the second communication scheme 820 which uses the received address information.

Figure 9:
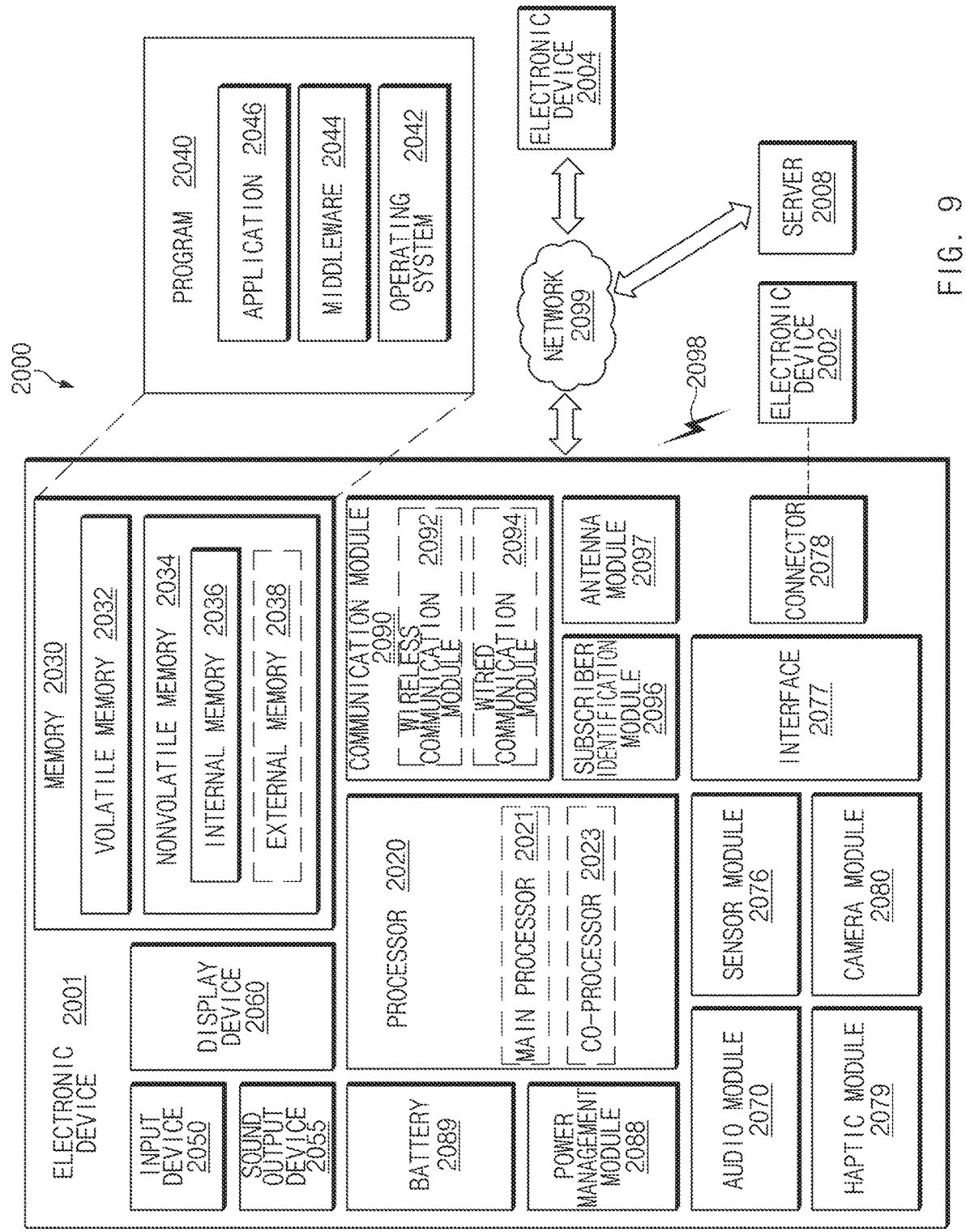
FIG. 9 is a block diagram of an electronic device in a network environment, according to an embodiment of the disclosure.

FIG. 9 is a block diagram of an electronic device 2001 in a network environment 2000, according to an embodiment of the disclosure.

Referring to FIG. 9, the electronic device 2001 in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and a coprocessor 2023 (e.g., a graphic processing device, an image signal processor, a sensor hub processor, or a communication processor), which may be operated independently of or together with the main processor 2021. Additionally or alternatively, the coprocessor 2023 may be configured to use lower power than the main processor 2021 or to be specialized for a specified function. The coprocessor 2023 may be implemented separately from the main processor 2021 or may be implemented as a part of the main processor 2021.

The coprocessor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the coprocessor 2023 (e.g., an image signal processor or a communication processor) may be implemented as a part of any other component (e.g., the camera module 2080 or the communication module 2090) which is functionally (or operatively) associated with the coprocessor 2023.

The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034. The nonvolatile memory 2034 may include an internal memory 2036 and an external memory 2038.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 2092 may verify and authenticate the electronic device 2001 within a communication network, such as the first network 2098 or the second network 2099, by using subscriber information (e.g., international mobile subscriber identity (IMSI)) stored in the subscriber identification module 2096.

The antenna module 2097 may transmit a signal or a power to the outside (e.g., an external electronic device) or may receive a signal or a power from the outside. According to an embodiment, the antenna module 2097 may include one or more antennas, and at least one antenna which is suitable for a communication scheme used in a computer network such as the first network 2098 or the second network 2099 may be selected, for example, by the communication module 2090 from the one or more antennas. The signal or power may be exchanged between the communication module 2090 and an external electronic device through the selected at least one antenna or may be received from the external electronic device through the selected at least one antenna and the communication module 2090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or server 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

According to various embodiments, an electronic device includes a camera, a display, a communication module, a memory and a processor electrically connected to the camera, the display, the communication module, and the memory, wherein the processor is configured to transmit an advertising signal including first identification information of the electronic device to a peripheral external device by using a first communication scheme, receive a response signal including second identification information of the external device by using the first communication scheme, and when a first user input shooting an image is made, store image data collected through the camera to the memory in connection with the second identification information.

According to various embodiments, the processor is configured to when the second identification information is matched in a database associated with an address book stored in the memory, store the collected image data in connection with the second identification information.

According to various embodiments, the processor is configured to store the first identification information and the second identification information in metadata of the collected image data.

According to various embodiments, the response signal is an advertising signal by the first communication scheme.

According to various embodiments, the processor is configured to display a live view image in the display, and display the second identification information in a region adjacent to the live view image.

According to various embodiments, the first identification information is at least one of a name, a nickname, a phone number, an e-mail, or a birthday of a first user stored in the electronic device, and the second identification information is at least one of a name, a nickname, a phone number, an e-mail, or a birthday of a second user stored in the external device.

According to various embodiments, the processor is configured to display a list of images stored in the memory and a search field for inputting a keyword, determine whether a second user input searching for the keyword is made, and when the second user input is made, match the second identification information stored in connection with the image data with a keyword which is input to the keyword field. The processor is configured to update the list based on a result matched with the keyword.

According to various embodiments, the processor is configured to display at least one of images stored in the memory in the display, and recognize a peripheral device by the first communication scheme. The processor is configured to when third identification information of the peripheral device is included in metadata of the displayed image, display the third identification information in the display. The processor is configured to receive address information for connection of the second communication scheme in a process of recognizing the peripheral device, by the first communication scheme.

According to various embodiments, the processor is configured to determine whether a third user input selecting the third identification information displayed in the display is made, and when the third user input is made, transmit the image to the peripheral device corresponding to the address information by using the second communication scheme.

According to various embodiments, the second communication scheme is faster in a data transfer rate than the first communication scheme.

According to various embodiments, the first communication scheme corresponds to Bluetooth low energy (BLE) communication.

According to various embodiments, an image display method performed in an electronic device includes transmitting an advertising signal including first identification information of the electronic device to a peripheral external device by using a first communication scheme, receiving a response signal including second identification information of the external device by using the first communication scheme, and when a first user input shooting an image is made, storing image data collected through a camera to a memory in connection with the second identification information.

According to various embodiments, the method further includes when the second identification information is matched in a database associated with an address book stored in the memory, storing the collected image data in connection with the second identification information.

According to various embodiments, the method further includes storing the first identification information and the second identification information in metadata of the collected image data.

According to various embodiments, the method further includes displaying a list of images stored in the memory and a search field for inputting a keyword, determining whether a second user input searching for the keyword is made, and when the second user input is made, matching the second identification information stored in connection with the image data with a keyword which is input to the field.

According to various embodiments, the method further includes updating the list based on a result matched with the keyword.

According to various embodiments, the method further includes displaying at least one of images stored in the memory in a display, and recognizing a peripheral device by using the first communication scheme.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. An electronic device comprising:
a camera;
a display;
a communication processor;
a memory; and
a processor electrically connected to the camera, the display, the communication processor, and the memory,
wherein the processor is configured to:
transmit, via the communication processor, an advertising signal including first identification (ID) information of the electronic device to a peripheral external device by using a first communication scheme,
receive, via the communication processor, a response signal including second ID information of the peripheral external device by using the first communication scheme,
when a first user input shooting an image is made after receiving the response signal, store image data collected through the camera in the memory together with the second ID information,
display a first image based on the stored image data on the display using a gallery application,
recognize at least one device by using the first communication scheme, and
when third ID information of the at least one device is included in metadata of the displayed first image, display the third ID information with the first image on the display.

2. The electronic device of claim 1, wherein the processor is further configured to, when the second ID information is matched in a database (DB) associated with an address book stored in the memory, store the image data together with the second ID information.

3. The electronic device of claim 1, wherein the processor is further configured to store the first ID information and the second ID information as metadata of the image data.

4. The electronic device of claim 1, wherein the response signal comprises an advertising signal.

5. The electronic device of claim 1, wherein the processor is further configured to:
display a live view image on the display, and
display the second ID information in a region adjacent to the live view image.

6. The electronic device of claim 1,
wherein the first ID information comprises at least one of a name, a nickname, a phone number, an e-mail, or a birthday of a first user stored in the electronic device, and
wherein the second ID information comprises at least one of a name, a nickname, a phone number, an e-mail, or a birthday of a second user stored in the peripheral external device.

7. The electronic device of claim 1, wherein the processor is further configured to:
display a list of images stored in the memory and display a search field for inputting a keyword,
determine whether a second user input searching for the keyword is received, and
when the second user input is received, match the second ID information stored in connection with the image data with the keyword input to the search field.

8. The electronic device of claim 7, wherein the processor is further configured to update the list based on a result matched with the keyword.

9. The electronic device of claim 1, wherein the processor is further configured to receive address information for connection of a second communication scheme in a process of recognizing the at least one device by using the first communication scheme.

10. The electronic device of claim 9, wherein the processor is further configured to:
determine whether a third user input selecting the third ID information displayed on the display is received, and
when the third user input is received, transmit the at least one of images to the at least one device corresponding to the address information by using the second communication scheme.

11. The electronic device of claim 9, wherein the second communication scheme comprises a faster data transfer rate than the first communication scheme.

12. The electronic device of claim 1, wherein the first communication scheme corresponds to bluetooth low energy (BLE) communication.

13. An image display method of an electronic device, the method comprising:
transmitting an advertising signal including first identification (ID) information of the electronic device to a peripheral external device by using a first communication scheme;
receiving a response signal including second ID information of the peripheral external device by using the first communication scheme;
when a first user input shooting an image is made after receiving the response signal, storing image data collected through a camera of the electronic device in a memory together with the second ID information;
displaying a first image based on the stored image data on the display using a gallery application;
recognizing at least one device by using the first communication scheme; and
when third ID information of the at least one device is included in metadata of the displayed first image, displaying the third ID information with the first image on the display.

14. The method of claim 13, further comprising, when the second ID information is matched in a database (DB)

associated with an address book stored in the memory, storing the image data together with the second ID information.

15. The method of claim 13, further comprising storing the first ID information and the second ID information as metadata of the image data.

16. The method of claim 13, further comprising:
   displaying a list of images stored in the memory and displaying a search field for inputting a keyword;
   determining whether a second user input searching for the keyword is received; and
   when the second user input is received, matching the second ID information stored in connection with the image data with the keyword input to the search field.

17. The method of claim 16, further comprising updating the list based on a result matched with the keyword.

* * * * *